United States Patent
Eggert et al.

(10) Patent No.: US 11,218,189 B1
(45) Date of Patent: Jan. 4, 2022

(54) METHOD AND APPARATUS PROVIDING COMMON PATH DISTORTION (CPD) DETECTION FROM A FIELD INSTRUMENT

(71) Applicant: VIAVI SOLUTIONS INC., San Jose, CA (US)

(72) Inventors: Loren R. Eggert, Indianapolis, IN (US); Daniel K. Chappell, Indianapolis, IN (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 17/066,899

(22) Filed: Oct. 9, 2020

(51) Int. Cl.
*H04B 3/46* (2015.01)
*H04B 3/487* (2015.01)

(52) U.S. Cl.
CPC .................................. *H04B 3/487* (2015.01)

(58) Field of Classification Search
CPC ...................................................... H04B 3/487
USPC ............................................................ 375/227
See application file for complete search history.

(56) References Cited

U.S. PATENT DOCUMENTS

| | | | | |
|---|---|---|---|---|
| 7,788,050 B2* | 8/2010 | Williams | ............... | H04N 17/00 702/59 |
| 2009/0296896 A1* | 12/2009 | Zhang | .................... | H04B 3/466 379/32.04 |
| 2010/0208785 A1* | 8/2010 | Lindqvist | ................ | H04M 3/34 375/227 |
| 2012/0219123 A1* | 8/2012 | Berg | ....................... | H04B 3/487 379/27.01 |
| 2018/0219621 A1* | 8/2018 | Zinevich | ............ | H04B 10/0773 |

* cited by examiner

*Primary Examiner* — Don N Vo
(74) *Attorney, Agent, or Firm* — DLA Piper LLP (US)

(57) ABSTRACT

A method and an apparatus providing common path distortion (CPD) detection from a field instrument, particularly when the source of the common path distortion is at a portion of the network beyond the subscriber's tap.

18 Claims, 11 Drawing Sheets

METHOD AND APPARATUS PROVIDING COMMON PATH DISTORTION (CPD) DETECTION FROM A FIELD INSTRUMENT

BACKGROUND

In a cable system, a network of interconnected electrical cables, referred to as a cable plant, is commonly used to deliver information to subscribers. Most cable network systems are coaxial-based broadband access systems that may take the form of all-coax network systems, hybrid fiber coax (HFC) network systems, or RF over glass (RFOG) network systems. Cable network system designs, including, for example, cable television (CATV) network system designs, typically use a tree-and-branch architecture that permits bi-directional data transmission, including Internet Protocol (IP) traffic between the cable system head-end and customer locations. There is a forward or downstream signal path (from the cable system head-end to the customer location) and a return or upstream signal path (from the customer location back to the cable system head-end). The upstream and the downstream signals occupy separate frequency bands. The frequency range of the upstream band is from 5 MHz to 42 MHz, 5 MHz to 65 MHz, 5 MHz to 85 MHz, or 5 MHz to 204 MHz, while the downstream frequency band is positioned in a range above the upstream frequency band.

Customer locations may include, for example, cable network subscriber's premises. Typical signals coming from a subscriber's premises include, for example, set top box DVR/On Demand requests, test equipment data channels, and Internet Protocol output cable modem carriers defined by the Data Over Cable Service Interface Specification ("DOCSIS"), which is one communication standard for bidirectional data transport over a cable network system.

FIG. 1 illustrates an example cable plant 10, which may be part of a much larger network such as e.g., a cable TV network that delivers cable TV signals, including digital TV signals and data and control signals, to end users at customer premises 22, 26 in the downstream direction. In addition, the cable plant 10 may receive and forward data and other signals from the customer premises 22, 26 in the upstream direction.

The cable plant 10 may include one or more trunk cables 12, which may be buried in the ground or elevated above the ground on e.g., utility poles, or a combination of both. The one or more trunk cables 12 may originate from a headend of the cable network (not shown). The headend may include a cable modem termination system (CMTS), which handles signals on the one or more trunk cables 12 and performs functions known to be performed by headends in cable TV networks. Subscriber tap ports 14, 16 and drops 18, 20 may be used to connect one of the trunk cables 12 to the customer premises 22, 26, respectively. At the customer premises 22, 26, the downstream signals may be demodulated using cable modems or set top boxes (not shown), which may be connected to other customer premises equipment (not shown), such as wireless routers, smart televisions, personal computers, smartphones, etc.

Increased bandwidth utilization and the bidirectional use of cable plants 10 have increased the sensitivity of cable networks to network impairments. One such impairment, affecting mostly upstream signals, is common path distortion (CPD). Common path distortion is a problem in cable networks where signals pass through a portion of the network that distorts the signals in a non-linear way. When the signals pass through this non-linear effect, they mix and produce new signals that are the second and third order intermodulation products. When these signals fall within the return path, they can travel back to the headend. Due to the funnel effect of the upstream path, a small noise contribution from many distinct sources will combine together and can create a significantly elevated noise floor at the headend.

Although common path distortion varies in severity and manifests itself in many different ways, it has a very distinctive spectral signature. Typically, common path distortion is characterized by a significant rise of the noise floor across the upstream spectral band. The rise of the noise floor is accompanied by spectral beats spaced apart at e.g., 6 MHz intervals. The spectral beats also occur in the upstream spectral band. Common path distortion can cause a major reduction of carrier-to-impairment power ratios, leading to errors in upstream digital transmissions, which is undesirable.

As shown in FIG. 2, common path distortion can be generated in the portion of the network downstream from the customer tap port 14 as the result of e.g., a corroded ground block 24. In the illustrated example, downstream signals can cause common path distortion when they mix in the corroded ground block 24. A portion of the common path distortion is in the upstream signals, potentially affecting all premises 22, 26 connected to the trunk and or network nodes.

Finding the sources of common path distortion can be challenging. Especially, as they move closer to the network edge. As shown in FIG. 3, traditional upstream spectrum measurements using a conventional test instrument 50 do not work when the CPD source is located on the customer side. This is because the cable drop 18 needs to be disconnected from the tap port 14 (and hence the network) and connected to the test instrument 50. Since the return path noise is caused by the forward path signals (i.e., downstream signals), the noise stops once the cable is disconnected—even though the underlying defect (e.g., corroded ground block 24) is still present.

As shown by the example ingress scan level versus frequency graph 40, the test instrument 50 would not detect a failure since the noise (as shown by line 42) stops and or is below a predetermined pass/fail threshold level (as shown by line 44). This false test result is undesirable. It is also a waste of time and labor costs associated with a servicing technician who is trying to detect the source of the CPD. Significantly, once the drop 18 is reconnected to the tap port 14 and the network, the noise source and CPD will return because the forward path signals are once again present. This situation is also undesirable.

It may be possible to detect common path distortion if a reverse test port and an additional drop is added to the cable plant 10 (e.g., between the customer's premises 22 and the one or more trunk cables 12) and hardware changes are made to the test instrument 50. As can be appreciated, this would increase the cost of the cable plant 10 and network, particularly if this additional equipment was added for each customer in the network. Thus, this potential solution is also undesirable.

Accordingly, there is a need and desire to detect common path distortion using a test instrument, particularly when the source of the common path distortion is on the downstream side of the network (i.e., the portion of the network beyond the subscriber's tap).

SUMMARY

Embodiments described herein may be configured to provide common path distortion detection from a field instrument and when the source of the common path distortion is on the downstream side of the network. As used herein, "downstream side of the network" is the portion of the network beyond the subscriber's tap. In one embodiment, a computer-implemented method is provided. The method is performed on a test instrument adapted to test for common path distortion at a downstream portion of a cable television network and may comprise: transmitting a first test signal having a first frequency into the downstream portion of the network; transmitting a second test signal having a second frequency into the downstream portion of the network; measuring a first input signal at a third frequency; measuring a second input signal at a fourth frequency, the third and fourth frequencies being different frequencies and based on the first and second frequencies; and determining that the downstream portion of the network is experiencing common path distortion based on a characteristic of the first or second input signals.

In another embodiment, a test instrument for testing for common path distortion at a downstream portion of a cable television network is provided. The test instrument comprises a storage device; and a processor executing program instructions stored in the storage device and being configured to determine transmit a first test signal having a first frequency into the downstream portion of the network; transmit a second test signal having a second frequency into the downstream portion of the network; measure a first input signal at a third frequency; measure a second input signal at a fourth frequency, the third and fourth frequencies being different frequencies and based on the first and second frequencies; and determine that the downstream portion of the network is experiencing common path distortion based on a characteristic of the first or second input signals.

In one or more embodiments, the third frequency is a combination of the first and second frequencies and the fourth frequency is the difference between the first and second frequencies. In one or more embodiments, a quiet zone is determined and the first and second frequencies are selected such that the third and fourth frequencies fall within the quiet zone.

DETAILED DESCRIPTION OF SEVERAL EMBODIMENTS

The disclosed principles provide a technique to detect common path distortion using a test instrument that may be particularly well suited for situations when the source of the common path distortion is on the downstream side of a network. In one or more embodiments, the disclosed method and test instrument couples together the instrument's measurement capability with its transmit capability to perform a unique CPD detection method. For example, when the customer side cable drop is connected to the test instrument and disconnected from the cable plant and network, predetermined signals can be output from the instrument's transmitter and into the premises via the drop. The test instrument may then take measurements at one or more frequencies where signals are expected to be present if there was a non-linear effect (e.g., CPD) in the network. If the test instrument detects the expected signals, then the source of the common path distortion is near and the technician may perform additional testing at different locations at the premises to locate the source.

Figure 1:
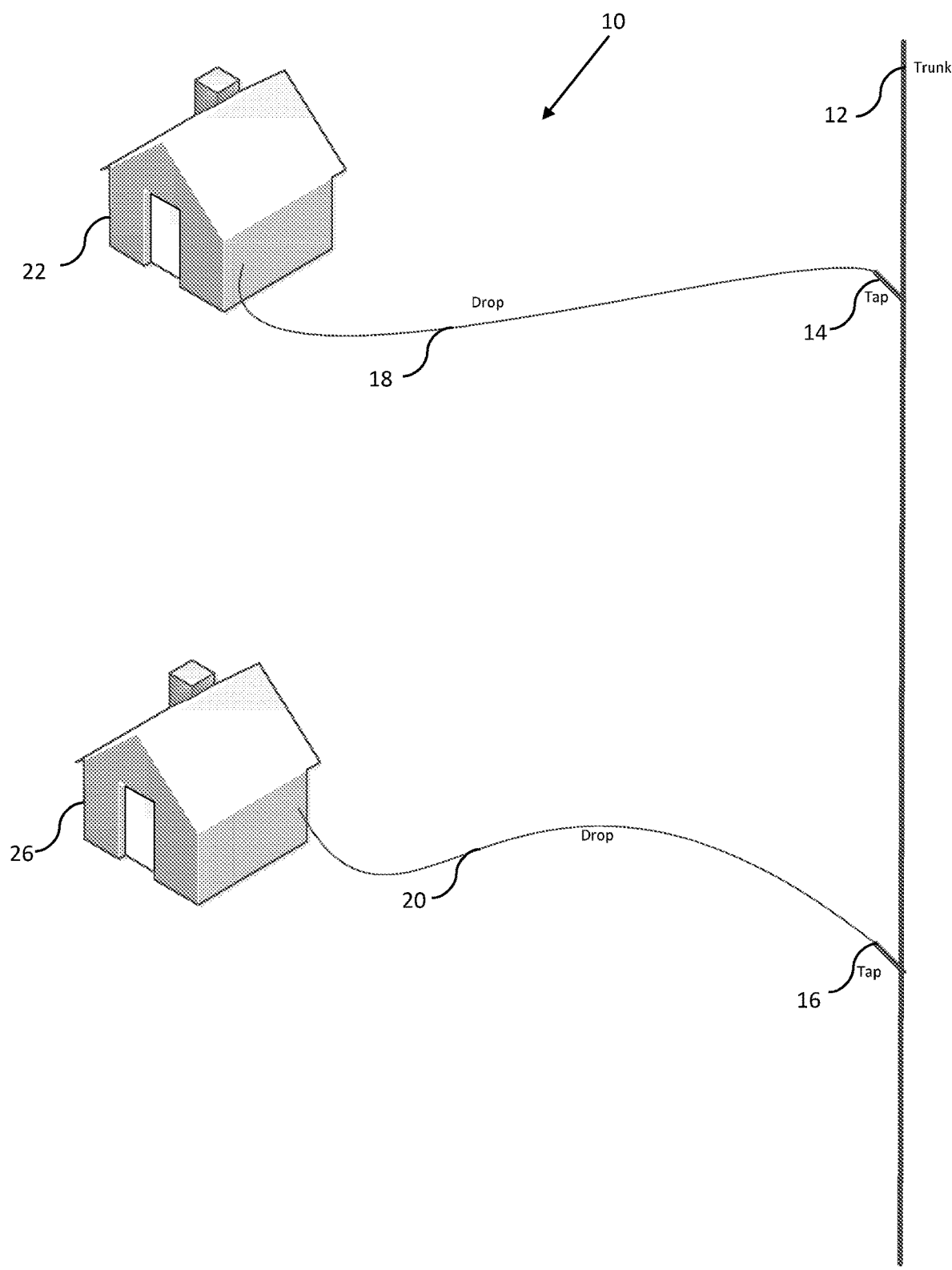
FIG. 1 shows an example of a conventional cable plant.
Figure 2:
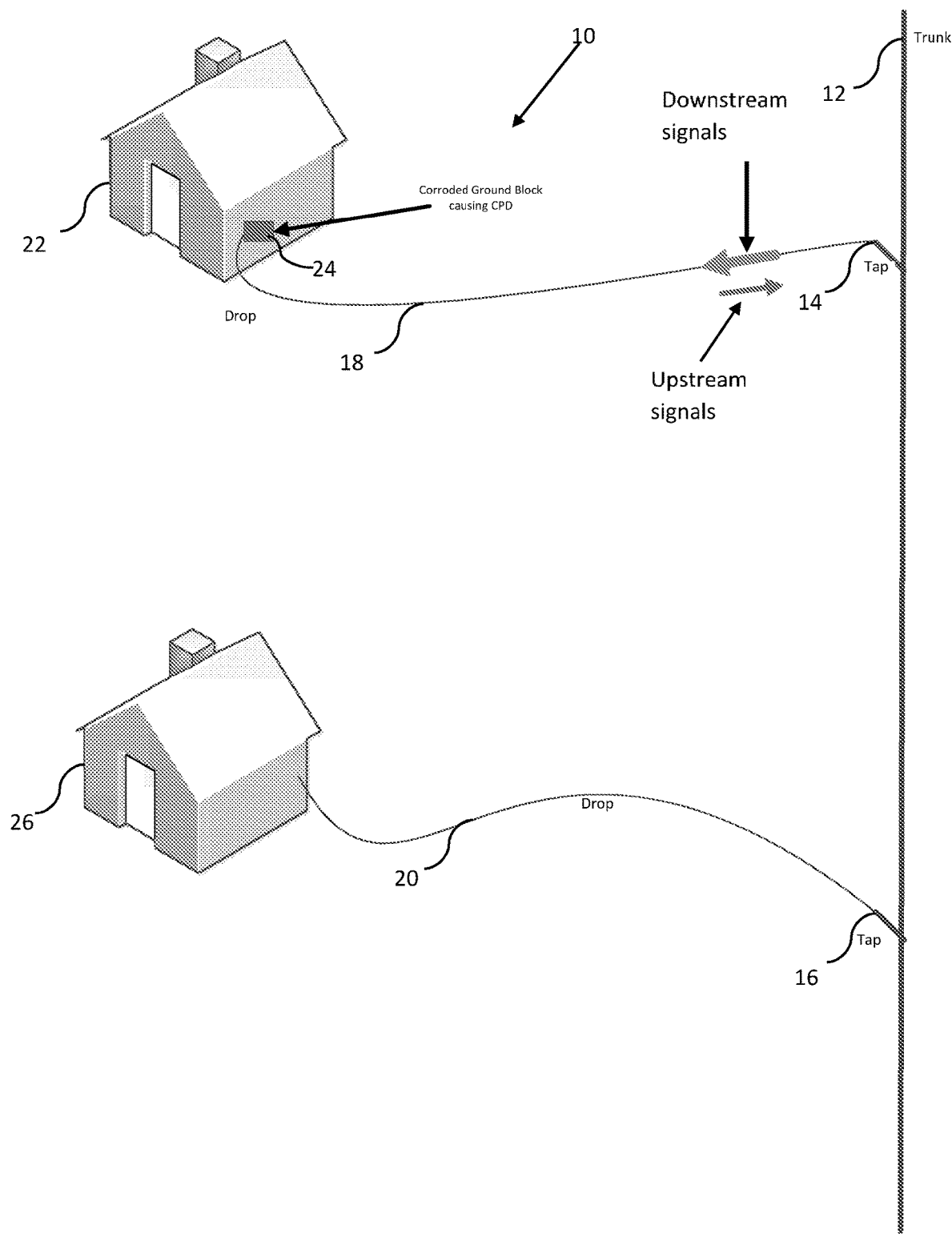
FIG. 2 shows the example cable plant of FIG. 1 experiencing common path distortion in a portion of the network downstream from a customer tap port.
Figure 4:
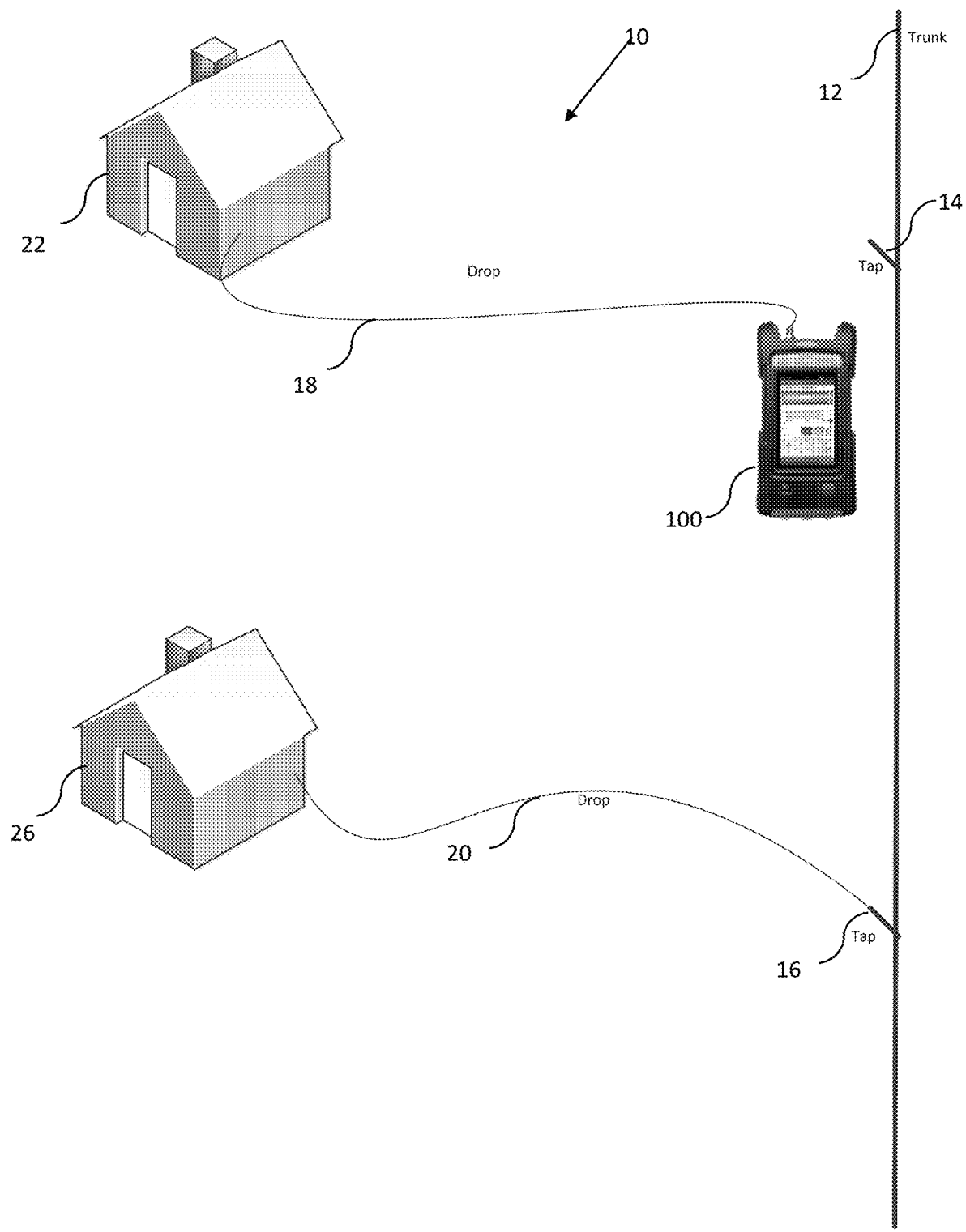
FIG. 4 shows the example cable plant of FIG. 1 undergoing one of the disclosed common path distortion detection methods using a test instrument constructed in accordance with the disclosed principles.

FIG. 4 shows the example cable plant 10 of FIG. 1 undergoing one of the disclosed common path distortion detection methods (e.g., method 200 of FIG. 5, method 250 of FIG. 7) using a test instrument 100 constructed in accordance with the disclosed principles. In one embodiment, the test instrument 100 is one of the OneExpert CATV line of analysis meters manufactured and sold by VIAVI Solutions Inc. that is modified to perform the processing disclosed herein. In one or more embodiments, the modifications can be made by a software/firmware upgrade.

Figure 3:
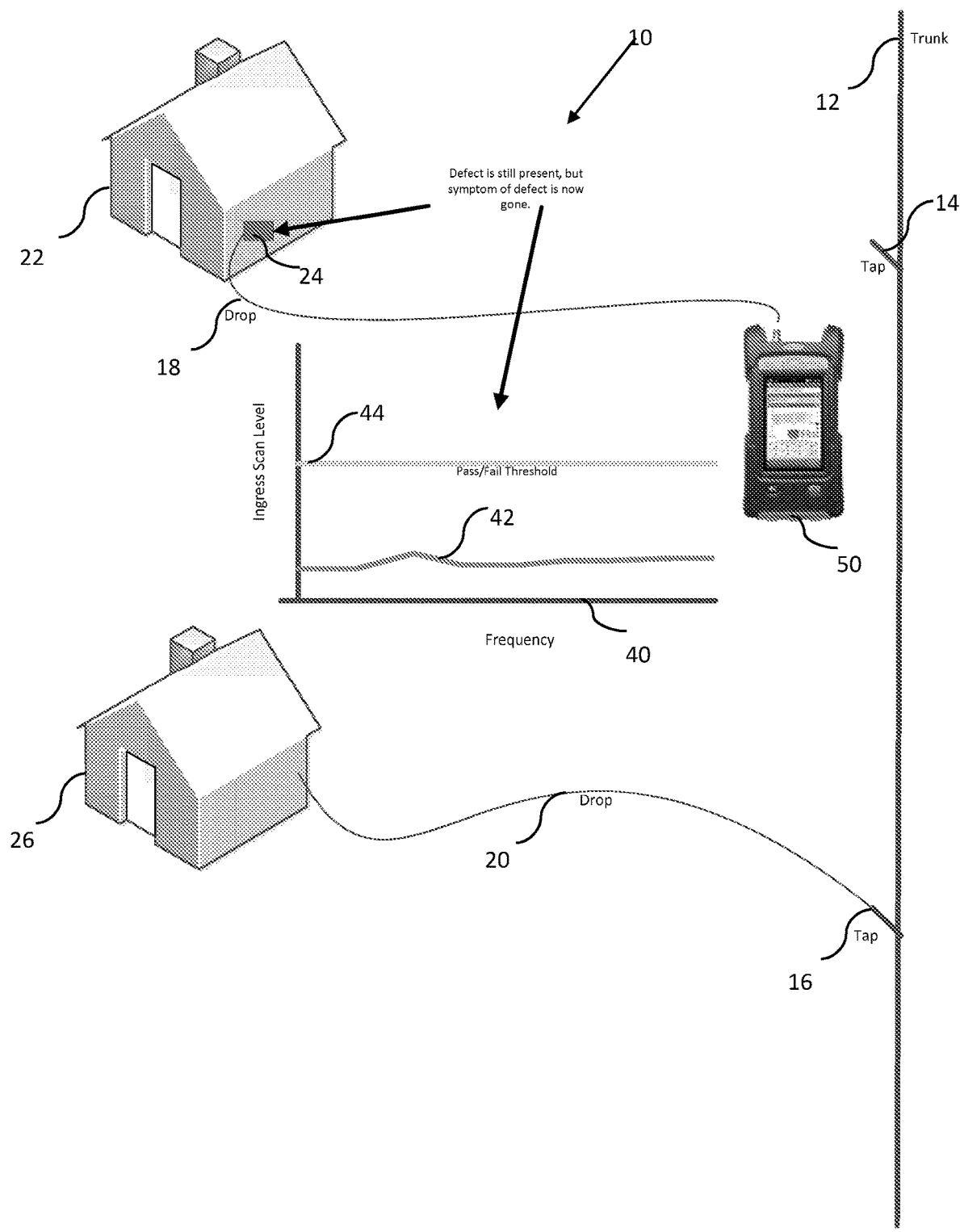
FIG. 3 shows the example cable plant of FIG. 1 undergoing a theoretical common path distortion trouble shooting method using a conventional test instrument.

As shown in FIG. 4, the cable drop 18 to the customer premises 22 is disconnected from the tap port 14 (and hence the network) and connected to the test instrument 100. In this configuration, and in accordance with the disclosed principles, the test instrument 100 will be able to generate, transmit, measure and process signals to help locate the source of common path distortion even though the source (e.g., corroded ground block 24) is located at the downstream side of the network. This is a substantial improvement over the conventional test instrument 50 (FIG. 3), which could not locate the source of common path distortion in this situation (i.e., when the customer drop 18 is disconnected from the tap port 14 and the source is on the downstream side of the network).

Figure 5:
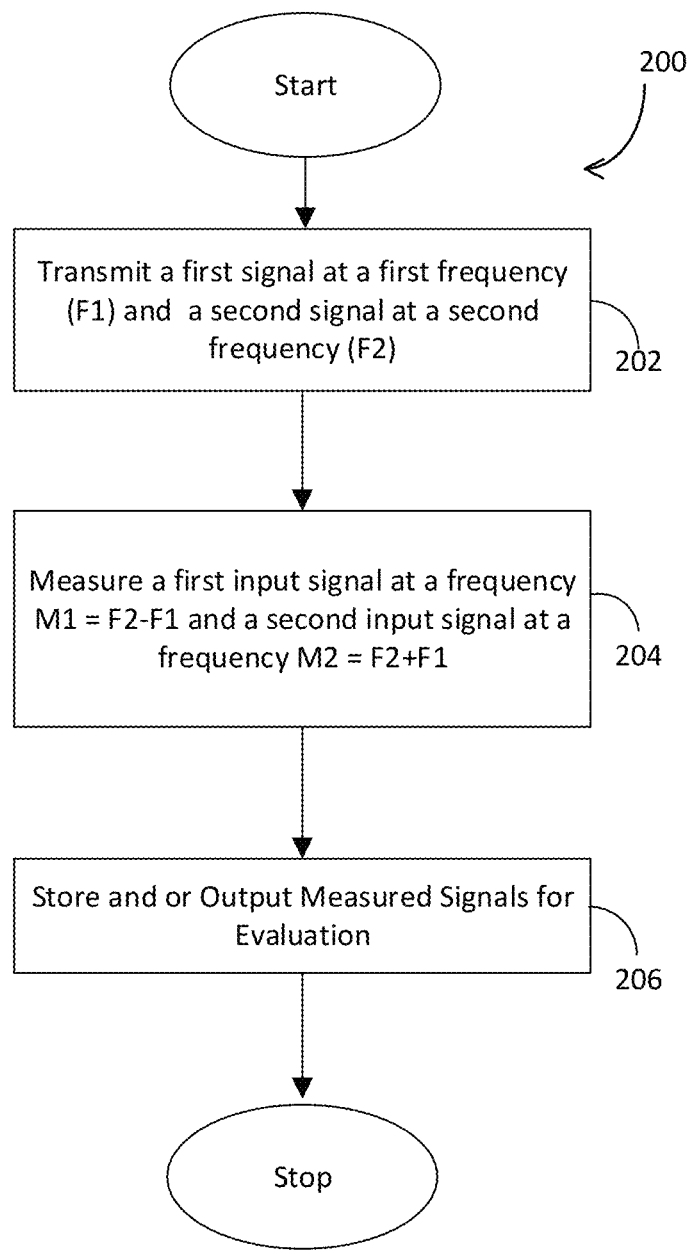
FIG. 5 shows a first example common path distortion detection method in accordance with the disclosed principles.
Figure 6:
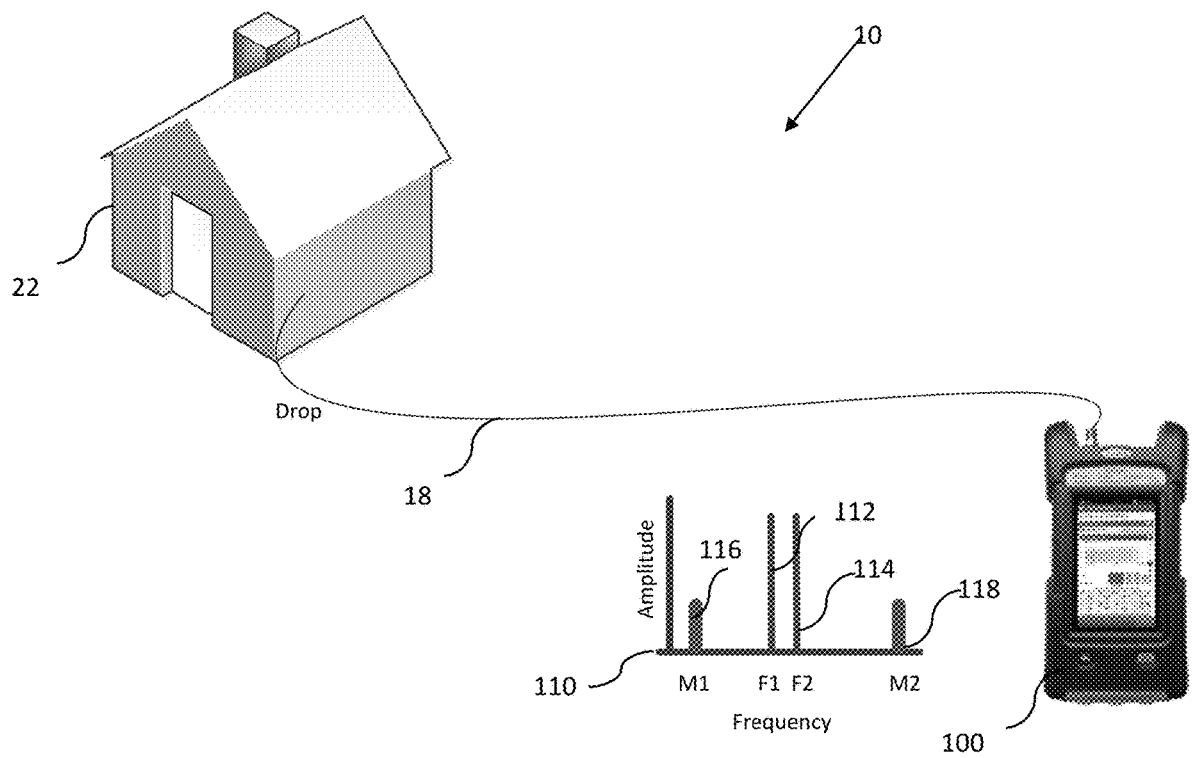
FIG. 6 shows the example cable plant of FIG. 1 undergoing the example common path distortion detection method illustrated in FIG. 5.

FIG. 5 shows a first example common path distortion detection method 200 in accordance with the disclosed principles and FIG. 6 shows the cable plant 10 of FIG. 1 undergoing method 200 using a test instrument 100 programmed to perform the method 200. In one embodiment, the method 200 may be activated by a technician and performed as part of a "CPD Check" performed by the test instrument 100. The method 200 may be activated using one or more buttons or a touchscreen included with the instrument 100 (described below in more detail with respect to FIG. 11). Regardless of how it is activated, the method 200 should be executed after the cable drop 18 to the customer premises 22 is disconnected from the tap port 14 (and hence the network) and connected to the test instrument 100.

At step 202, and as shown in the amplitude v. frequency graph 110 of FIG. 6, the test instrument 100 may transmit a first test signal having a first predetermined frequency F1 (as shown by line 112) and a second test signal having a second predetermined frequency F2 (as shown by line 114) to the drop 18 and hence the customer's premises 22. For example, two continuous wave signals may be output with the first having a frequency F1 equal to 9 MHz and the second having a frequency F2 equal to 16 MHz.

As discussed above, the test instrument 100 may be programmed to take measurements at one or more frequencies where signals are expected to be present if there was a non-linear effect (e.g., CPD) in the network. In the illustrated example, at step 204, the test instrument 100 is programmed to take a first input signal measurement at a frequency M1 equal to F2−F1 (as shown by line 116) and a second input signal measurement at a frequency M2 equal to F2+F1 (as shown by line 118). In keeping with the current example, where the first test signal is output at a first frequency F1 of 9 MHz and the second test signal is output at a second frequency F2 of 16 MHz, the test instrument 100 may make the first measurement at frequency M1 equal to F2−F1 (i.e., 16 MHz-9 MHz) or 7 MHz and the second measurement at frequency M2 equal to F2+F1 (i.e., 16 MHz+9 MHz) or 25 MHz to see if there are signals present from the mixing of the two test signals and their frequencies.

In one or more embodiments, a signal is present at a measurement frequency M1, M2 if the signal has an amplitude above a predetermined threshold. In accordance with the disclosed principles, if the test instrument 100 measures signals having an amplitude above a predetermined threshold at the M1, M2 frequencies, it has detected the expected signals, meaning that the source of the common path distortion is near. In one or more embodiments, the predetermined threshold could be set to 0 (i.e., any signal present at the M1, M2 frequencies is evidence of CPD). In one or more embodiments, the predetermined threshold could be set to a noise floor or a baseline noise level (i.e., any signal present at the M1, M2 frequencies above the noise floor or baseline noise level is evidence of CPD).

In one embodiment, at step 206, the test instrument 100 may store and or output the measured signals and or their amplitudes for evaluation by the technician. In one or more embodiments, the test instrument 100 could output an affirmative indicator to alert the technician that measured signals at frequencies M1, M2 are present and the source of the CPD may be near. For example, the test instrument 100 could provide a visual indication of the amplitude of the measured signals at frequencies M1, M2 (e.g., as shown in graph 110). In addition to, or alternatively, the test instrument 100 could provide a message or graphical indicator to alert the technician that the measured signals at frequencies M1, M2 exceed the threshold. Moreover, or alternatively, the test instrument 100 could output audible and or haptic (e.g., vibration) indicators when the measured signals at frequencies M1, M2 exceed the threshold.

Regardless of the output at step 206, the technician may repeat method 200 after connecting the test instrument 100 to a different connection point within the customer's premises 22. This will allow the technician to perform additional testing at different locations at the premises 22 to hone in on and or locate the source of the CPD. In one or more embodiments, the test instrument 100 could perform the method 200 using multiple different frequencies to determine if there is any frequency selectivity to the non-linear effect. That is, the test instrument 100 could be programmed to transmit signals having frequencies F1, F2 other than 9 MHz and 16 MHz, meaning that it would be programmed to measure expected signals at different M1, M2 frequencies.

Figure 7:
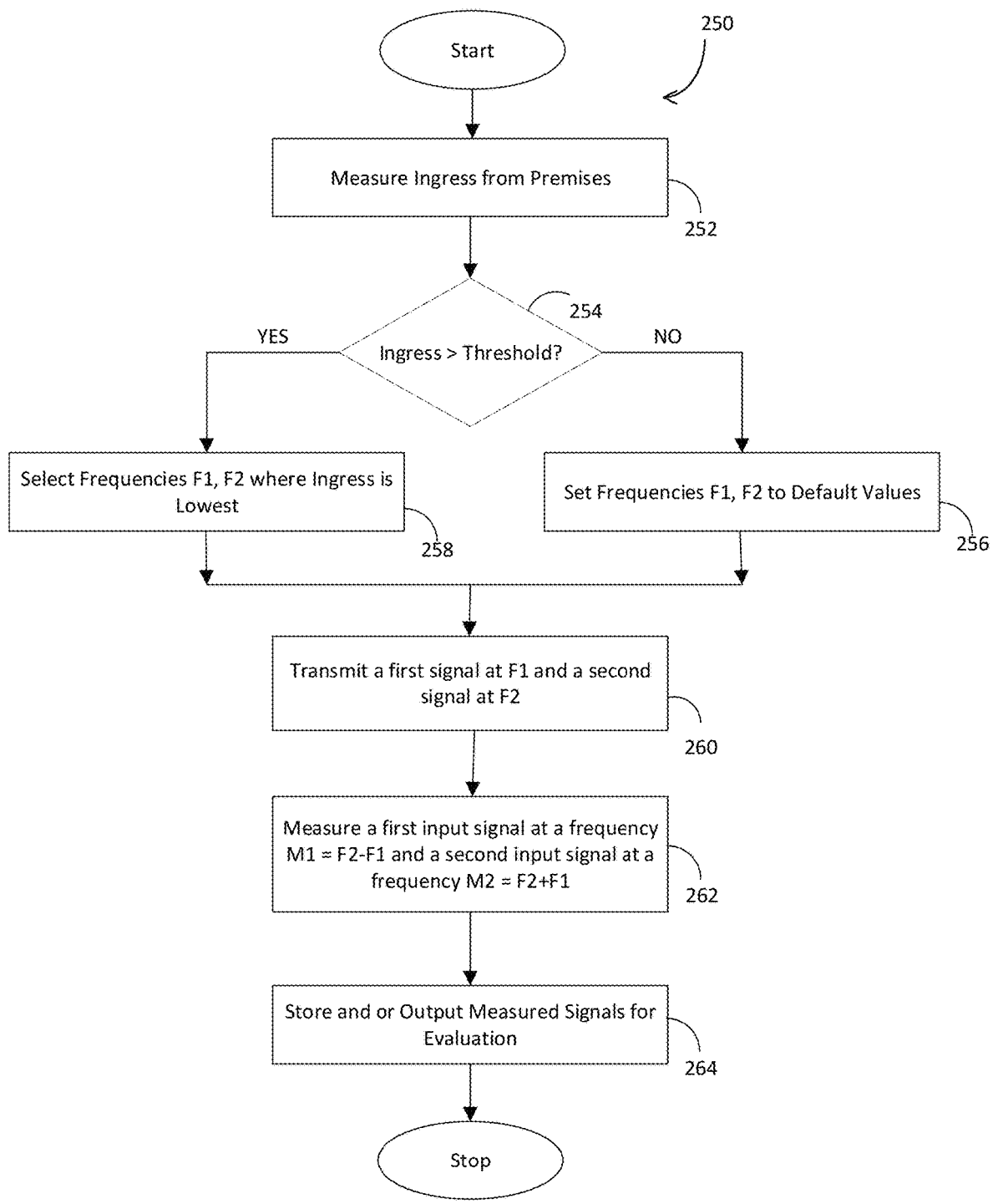
FIG. 7 shows a second example common path distortion detection method in accordance with the disclosed principles.

FIG. 7 shows a second example common path distortion detection method 250 in accordance with the disclosed principles. The test configuration would be similar to the configuration shown in FIG. 4 except that the test instrument 100 is programmed to perform method 250. In one embodiment, the method 250 may be activated by a technician and performed as part of a "CPD Check" performed by the test instrument 100. The method 250 may be activated using one or more buttons or a touchscreen included with the instrument 100 (described below in more detail with respect to FIG. 11). Regardless of how it is activated, the method 250 should be executed after the cable drop 18 to the customer premises 22 is disconnected from the tap port 14 (and hence the network) and connected to the test instrument 100.

In this example method 250, the test instrument's 100 ingress measurement capability will be utilized to determine the frequencies that the test signals should be transmitted at (i.e., F1, F2) and measured at (i.e., M1, M2). In one or more embodiments, a standard ingress measurement may be taken and used to identify one or more frequencies within a measurement pass band having the smallest amount of ingress noise. One or more of these frequencies could be chosen and used for the frequencies F1, F2 of the test signals output by the transmitter so that any resulting expected measured signal would be placed within these "quiet" zones. As can be appreciated, this may provide additional depth of the measurements and certainty that the measured signals are from the intermixing of the two test signals and not some other source of ingress.

Figure 8:
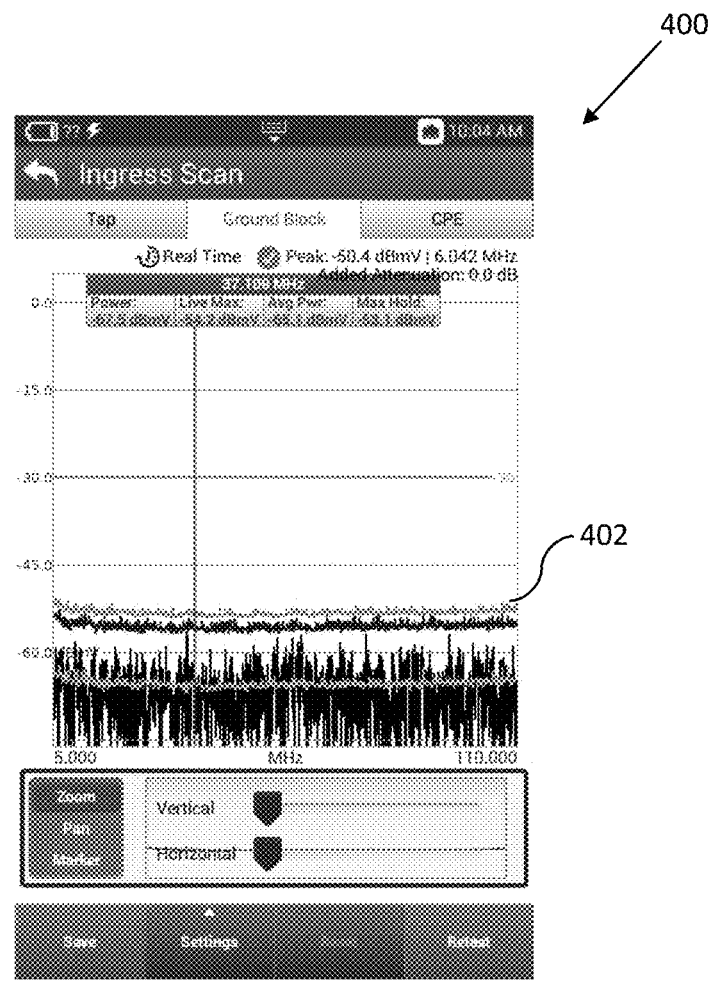
FIGS. 8 and 9 show examples for determining where the test instrument may or may not intentionally select "quiet zones" in accordance with the disclosed principles.

To this end, at step 252, the test instrument may measure ingress at the customer's premises 22. Any type of ingress measurement may be performed. For example, if the test instrument 100 is a OneExpert meter modified to perform the processing disclosed herein, step 252 may be performed using its OneCheck functionality. At step 254, the test instrument 100 may determine if the measured ingress exceeds a predetermined ingress threshold or not. If it is determined that the measured ingress does not exceed the predetermined ingress threshold (i.e., a NO at step 254), the method 250 continues at step 256 where the frequencies F1, F2 of the test signals and frequency of the measured signals M1, M2 are set to default values. That is, because the ingress scan of step 252 is good (i.e., low ingress from the premises, flat across frequency, etc.), the method's 250 measurements at frequencies M1, M2 would not be affected by ingress noise and the test signal frequencies F1, F2 most likely do not need to be adjusted from the default values. This situation is illustrated in example 400 shown in FIG. 8. As can be seen, the example 400 shows amplitudes of the ingress (shown by line 402) as being substantially flat across the frequency range of 5 MHz to 110 MHz. In one or more embodiments, the frequencies F1, F2 selected at step 254 may be the same frequencies discussed above with respect to method 200.

If, however, it is determined that the measured ingress exceeds the predetermined ingress threshold (i.e., a YES at step 254), the method 250 continues at step 258 where the frequencies F1, F2 of the test signals and frequencies M1, M2 of the measured signals are selected in an attempt to avoid ingress noise from affecting the subsequent measurements at the measured frequencies M1, M2. That is, because the ingress scan shows that there is ingress coming from the premises 22, an attempt is made to find frequencies where the ingress is the lowest (or exclude frequencies where the ingress is high/higher than at other frequencies) to find regions (referred to herein as "quiet zones") to make the measurements with little or no impact from ingress noise.

Figure 9:
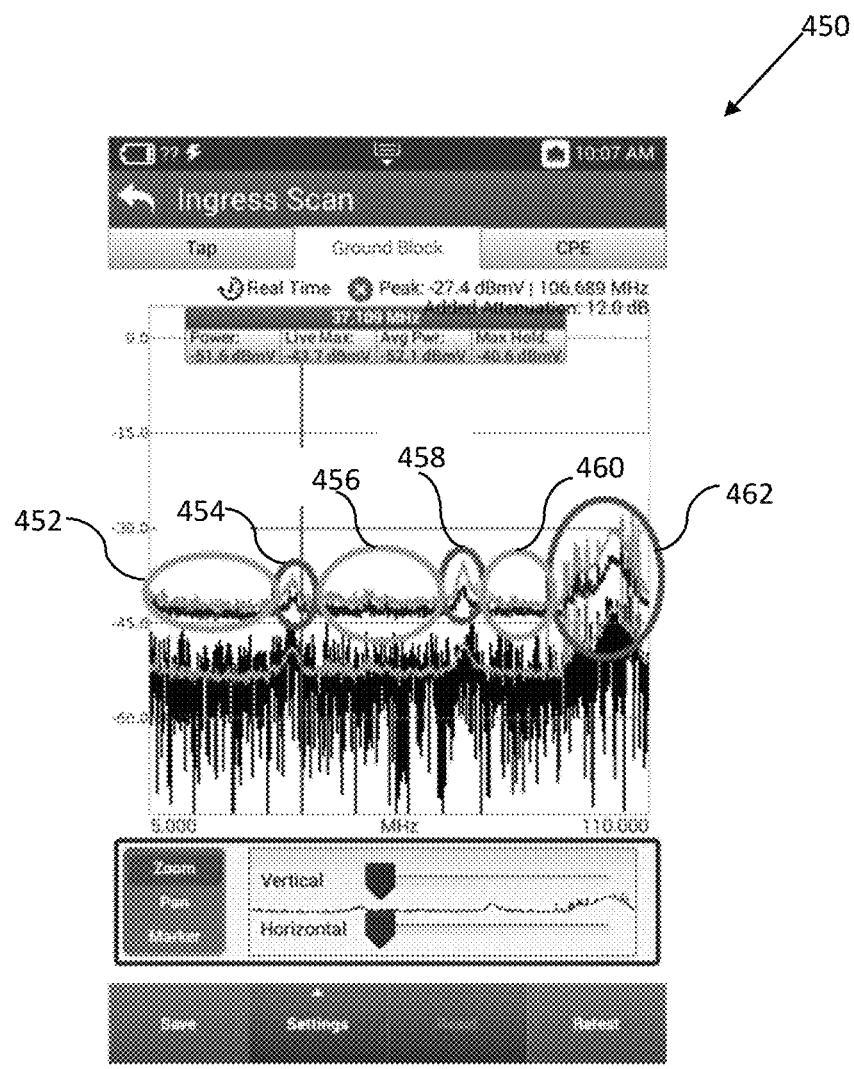

For example, as shown by example 450 illustrated in FIG. 9, there are three frequency ranges 452, 456, 460 where the ingress is flat. In addition, these frequency ranges 452, 456, 460 are relatively low in comparison to frequency ranges 454, 458, 462 displaying elevated and spiked ingress noise (i.e., "noisy regions"). In one embodiment, the frequencies F1, F2 of the test signals may be chosen such that the frequencies of the expected measured signals M1, M2 fall within one of the quiet regions (i.e., frequency ranges 452, 456, 460). In addition, or alternatively, the frequencies F1, F2 of the test signals may be chosen such that the frequencies of the expected measured signals M1, M2 do not fall within one of the noisy regions (i.e., frequency ranges 454, 454, 462).

Once the frequencies F1, F2 of the first and second test signals are selected (whether at step 256 or 258), the method continues at step 260 where the test instrument 100 transmits the first test signal at frequency F1 and the second test signal at frequency F2. The test instrument 100 may be programmed to make measurements at one or more frequencies M1, M2 where signals are expected to be present if there was a non-linear effect (e.g., CPD) in the network. In the illustrated example, at step 262, the test instrument 100 is programmed to take a first input signal measurement at a frequency M1 equal to F2−F1 and a second input signal measurement at a frequency M2 equal to F2+F1.

Figure 10:
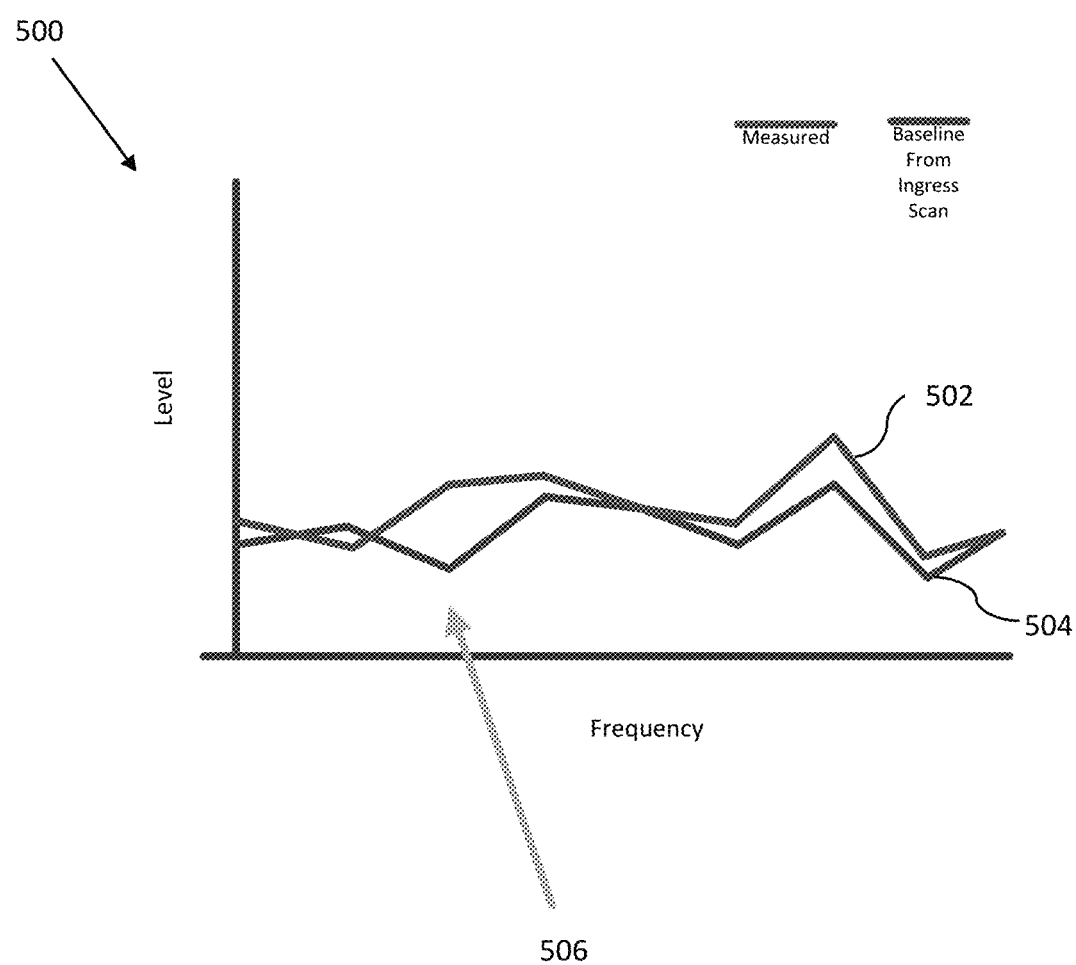
FIG. 10 shows a graph illustrating one example method for determining baseline noise that may be used in a common path distortion detection method in accordance with the disclosed principles.

In one or more embodiments, a signal is present at a measurement frequency M1, M2 if the signal has an amplitude above a predetermined threshold. In accordance with the disclosed principles, if the test instrument 100 measures signals having an amplitude above a predetermined threshold at the M1, M2 frequencies, it has detected the expected signals, meaning that the source of the common path distortion is near. In one or more embodiments, the predetermined threshold could be set to 0 (i.e., any signal present at the M1, M2 frequencies is evidence of CPD). In one or more embodiments, particularly when ingress is detected at step 254, the predetermined threshold could be set to a noise floor or a baseline noise level (i.e., any signal present at the M1, M2 frequencies above the noise floor or baseline noise level is evidence of CPD). FIG. 10 shows a graph 500 illustrating one example method for determining baseline noise that may be used during a threshold determination in step 262 in accordance with the disclosed principles. In accordance with the disclosed principles, the ingress scan (step 252) can be used to establish baseline noise, which can be subtracted from the measured values. The relative difference between the measured signal values and the baseline may be used for thresholding purposes. The example graph 500 includes one line 502 representing measured signal amplitude over a frequency range and a second line 504 representing measured ingress amplitude over the frequency range. Point 506 is the most relevant portion of the example graph 500 because it shows the biggest difference between the measured signals and ingress level.

In one embodiment, at step 264, the test instrument 100 may store and or output the measured signals and or their amplitudes for evaluation by the technician. In one or more embodiments, the test instrument 100 could output an affirmative indicator to alert the technician that measured signals at frequencies M1, M2 are present and the source of the CPD may be near. For example, the test instrument 100 could provide a visual indication of the amplitude of the measured signals at frequencies M1, M2. In addition to, or alternatively, the test instrument 100 could provide a message or graphical indicator to alert the technician that the measured signals at frequencies M1, M2 exceed the threshold. Moreover, or alternatively, the test instrument 100 could output audible and or haptic (e.g., vibration) indicators when the measured signals at frequencies M1, M2 exceed the threshold.

Regardless of the output at step 264, the technician may repeat method 250 after connecting the test instrument 100 to a different connection point within the customer's premises 22. This will allow the technician to perform additional testing at different locations at the premises 22 to hone in on and or locate the source of the CPD.

Figure 11:
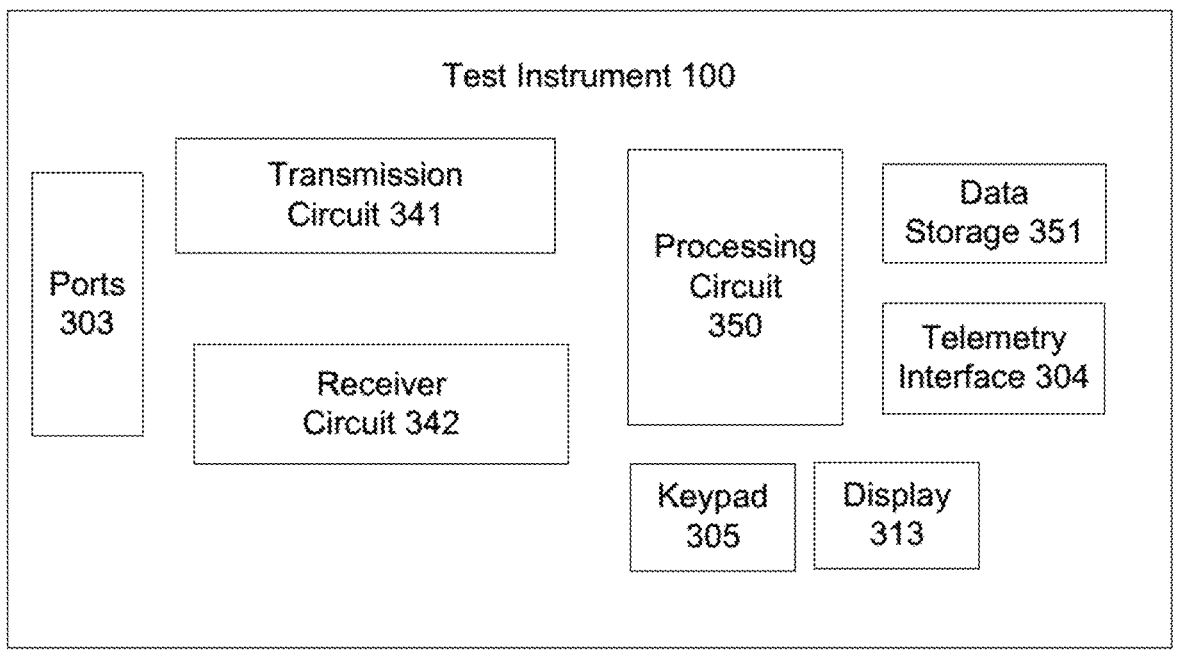
FIG. 11 shows an example of a test instrument for performing the common path distortion detection methods of FIGS. 5 and 7 in accordance with the principles disclosed herein.

FIG. 11 shows a high-level block diagram of the test instrument 100, according to an example embodiment. It should be appreciated that the test instrument 100 may include components other than those shown. The test instrument 100 may include one or more ports 303 for connecting the test instrument 100 to a tap, such as the tap ports 14, 16 shown in FIGS. 1-4 and 6. The one or more ports 303 may include connectors for connecting to cables in the cable plant 10 and the network that carry traffic for upstream and downstream channels. The traffic may include video, voice and data packets, etc. The test instrument 100 may include a telemetry interface 304 for connecting to a telemetry channel, such as a WiFi interface, Bluetooth interface, cellular interface or another network interface. The test instrument 100 may connect to a remote device via the telemetry interface 304.

The test instrument 100 may include a user interface, which may include a keypad 305 and display 313. The display 313 may include a touch screen display. A user may interact with the test instrument 100, such as to enter information, select operations, view measurements, view interference profiles, etc., via the user interface.

A data storage 351 may store any information used by the test instrument 100 and may include memory or another type of known data storage device. The data storage 351 may store measured signal data, ingress signal data, noise floor data, thresholds and/or any other measurements or data used by the test instrument 100, particularly the data required for methods 200 and 250. The data storage 351 may include a non-transitory computer readable medium storing machine-readable instructions executable by processing circuit 350 to perform operations of the test instrument 100 such as those described for method 200 and method 250.

Transmission circuit 341 may include a circuit for sending test signals upstream to perform various tests, such as frequency sweep tests. The transmission circuit 341 may include encoders, modulators, and other known component for transmitting signals over the cable plant 10 and within the network. Receiver circuit 342 may include components for receiving signals from the cable plant 10 and network. The components may include components such as a demodulator, decoder, analog-to-digital converters, and other known components suitable for a receiver circuit.

Processing circuit 350 may include any suitable hardware to perform the operations of the test instrument 100 described herein, including the operations described with respect to FIGS. 5 and 7 and the methods 200, 250 described herein. The operations may include transmitting test signals at desired frequencies measuring and testing operations and calculations described herein. The hardware of the test instrument 100, including the processing circuit 350, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument 100 described herein may be performed by the processing circuit 350 or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

The apparatus for implementing a common path distortion detection method disclosed herein provides numerous advantages over the current state of the art. For example, the test instrument and methods disclosed herein can help locate the source of common path distortion even when the source is located at the downstream side of the network. This is a substantial improvement over conventional test instruments, which could not locate the source of common path distortion in this situation. As a result, testing is more accurate than the conventional testing and better reflects the true performance of the network and its source of errors. This reduces the possibility that the servicing technician will mis-diagnose the CPD source or waste man-power, resources, time and/or money performing additional testing chasing down the problem.

In addition, no additional hardware is needed to carry out the methods 200, 250 disclosed herein—i.e., no additional hardware is required to modify the test instrument's hardware. Likewise, the costs associated with a reverse test port and or additional drops are not needed either. In one or more embodiments, the methods 200, 250 may be ported to pre-existing test instruments as part of a software upgrade. No board spin or additional product cost would be required to implement the disclosed principles. This means that the disclosed principles may be deployed on tens of thousands of test instruments that are already deployed in the field.

In one or more embodiments, testing may be performed at initial service installation, or upon the detection of service impairment.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method, said method being performed on a test instrument adapted to test for common path distortion at a downstream portion of a cable television network, said method comprising:
    transmitting a first test signal having a first frequency into the downstream portion of the network;
    transmitting a second test signal having a second frequency into the downstream portion of the network;
    measuring a first input signal at a third frequency;
    measuring a second input signal at a fourth frequency, the third and fourth frequencies being different frequencies and based on the first and second frequencies; and
    determining that the downstream portion of the network is experiencing common path distortion based on a characteristic of the first or second input signals.

2. The method of claim 1, wherein the third frequency is a sum of the first and second frequencies and the fourth frequency is the difference between the first and second frequencies.

3. The method of claim 1, further comprising determining a quiet zone and selecting the first and second frequencies such that the third and fourth frequencies fall within the quiet zone.

4. The method of claim 3, wherein determining the quiet zone comprises:
    measuring ingress at the downstream portion of the network;
    determining that the measured ingress is above a predetermined threshold; and
    identifying one or more frequencies where the measured ingress is flat compared to other frequencies.

5. The method of claim 3, wherein determining the quiet zone comprises:
    measuring ingress at the downstream portion of the network;
    determining that the measured ingress is above a predetermined threshold; and
    identifying one or more frequencies where the measured ingress is a lowest compared to other frequencies.

6. The method of claim 1, wherein the characteristic of the first or second input signals is an amplitude of the signals.

7. The method of claim 6, wherein determining that the downstream portion of the network is experiencing common path distortion comprises determining that the first or second input signals have an amplitude exceeding a predetermined threshold.

8. The method of claim 1, further comprising outputting an indication from the test instrument when it is determined that the downstream portion of the network is experiencing common path distortion.

9. The method of claim 8, wherein the output indication comprises one or more of a visual indication, audio indication or haptic indication.

10. A test instrument for testing for common path distortion at a downstream portion of a cable television network, said test instrument comprising:
    a storage device; and
    a processor executing program instructions stored in the storage device and being configured to:
        transmit a first test signal having a first frequency into the downstream portion of the network;
        transmit a second test signal having a second frequency into the downstream portion of the network;

measure a first input signal at a third frequency;

measure a second input signal at a fourth frequency, the third and fourth frequencies being different frequencies and based on the first and second frequencies; and determine that the downstream portion of the network is experiencing common path distortion based on a characteristic of the first or second input signals.

11. The test instrument of claim 10, wherein the third frequency is a sum of the first and second frequencies and the fourth frequency is the difference between the first and second frequencies.

12. The test instrument of claim 10, wherein the processor is further adapted to determine a quiet zone and select the first and second frequencies such that the third and fourth frequencies fall within the quiet zone.

13. The test instrument of claim 12, wherein the processor is adapted to determine the quiet zone by:

measuring ingress at the downstream portion of the network;

determining that the measured ingress is above a predetermined threshold; and identifying one or more frequencies where the measured ingress is flat compared to other frequencies.

14. The test instrument of claim 12, wherein the processor is adapted to determine the quiet zone by:

measuring ingress at the downstream portion of the network;

determining that the measured ingress is above a predetermined threshold; and identifying one or more frequencies where the measured ingress is a lowest compared to other frequencies.

15. The test instrument of claim 10, wherein the characteristic of the first or second input signals is an amplitude of the signals.

16. The test instrument of claim 15, wherein the processor is adapted to determine that the downstream portion of the network is experiencing common path distortion by determining that the first or second input signals have an amplitude exceeding a predetermined threshold.

17. The test instrument of claim 10, wherein the processor is further adapted to output an indication from the test instrument when it is determined that the downstream portion of the network is experiencing common path distortion.

18. The test instrument of claim 17, wherein the output indication comprises one or more of a visual indication, audio indication or haptic indication.

* * * * *